(12) United States Patent
Clyne et al.

(10) Patent No.: US 9,389,487 B2
(45) Date of Patent: Jul. 12, 2016

(54) PROTECTIVE LENS ATTACHMENT

(71) Applicant: GoPro, Inc., San Mateo, CA (US)

(72) Inventors: Joshua Randall Clyne, Sunnyale, CA (US); Richard Gioscia, Santa Clara, CA (US); Fong Tran, San Mateo, CA (US); Mark Costa, Menlo Park, CA (US); Barrie Dickinson, San Mateo, CA (US); Eric Kent, San Francisco, CA (US); Javier Yanez, Menlo Park, CA (US); Seungheon Lee, Cupertino, CA (US)

(73) Assignee: GoPro, Inc., San Mateo, CA (US)

( * ) Notice: Subject to any disclaimer, the term of this patent is extended or adjusted under 35 U.S.C. 154(b) by 0 days.

(21) Appl. No.: 14/456,998

(22) Filed: Aug. 11, 2014

(65) Prior Publication Data

US 2015/0093104 A1    Apr. 2, 2015

Related U.S. Application Data

(60) Provisional application No. 61/884,891, filed on Sep. 30, 2013.

(51) Int. Cl.
*G03B 11/00* (2006.01)
*G03B 17/08* (2006.01)
*G03B 11/04* (2006.01)

(52) U.S. Cl.
CPC ............... *G03B 17/08* (2013.01); *G03B 11/00* (2013.01); *G03B 11/04* (2013.01)

(58) Field of Classification Search
USPC ............... 396/25–29, 448, 544; 359/511
See application file for complete search history.

(56) References Cited

U.S. PATENT DOCUMENTS

| | | | | |
|---|---|---|---|---|
| 4,488,776 | A * | 12/1984 | Skinner | 359/808 |
| 5,734,994 | A * | 4/1998 | Rogers | 2/411 |
| 5,778,605 | A * | 7/1998 | Ellena et al. | 135/78 |
| 8,292,523 | B2 * | 10/2012 | Dowell | 396/448 |
| 2005/0115022 | A1 * | 6/2005 | Desmarais | A47B 91/066 16/42 R |
| 2007/0280091 | A1 * | 12/2007 | Apel et al. | 369/275.1 |
| 2014/0369674 | A1 * | 12/2014 | Neff | 396/448 |

* cited by examiner

*Primary Examiner* — Minh Phan
(74) *Attorney, Agent, or Firm* — Fenwick & West LLP

(57) ABSTRACT

A protective lens attachment is configured to couple to a camera lens ring to protect a camera lens during operation. The protective lens attachment can include a compressible structure, on which a force is exerted by a camera lens ring when the camera lens ring is inserted into the protective lens attachment. The compressible structure is configured to exert a reciprocal force onto the camera lens ring, creating a friction force between the compressible structure and the camera lens ring, and securely coupling the protective lens attachment to the camera lens ring.

14 Claims, 9 Drawing Sheets

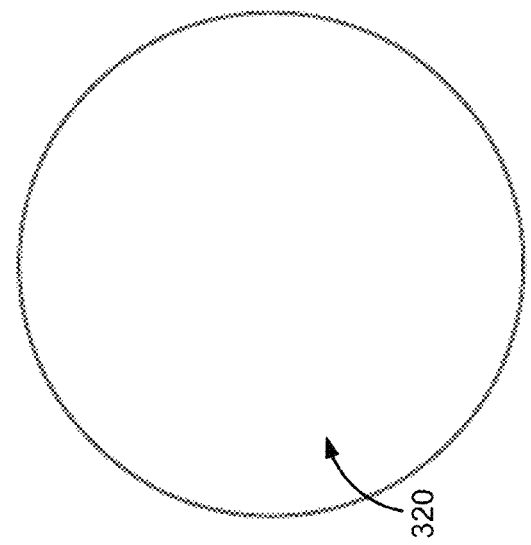
FIG. 3c (top view)
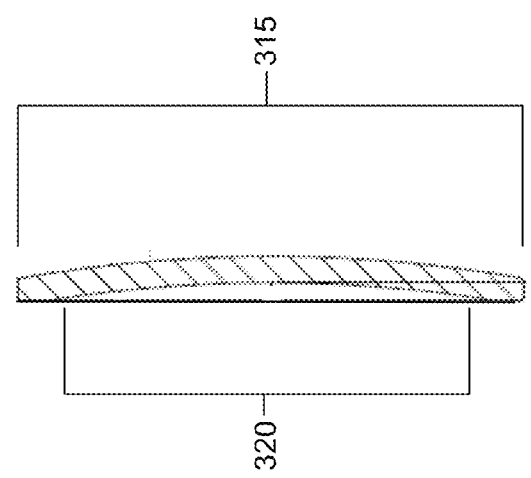
FIG. 3b (side view)
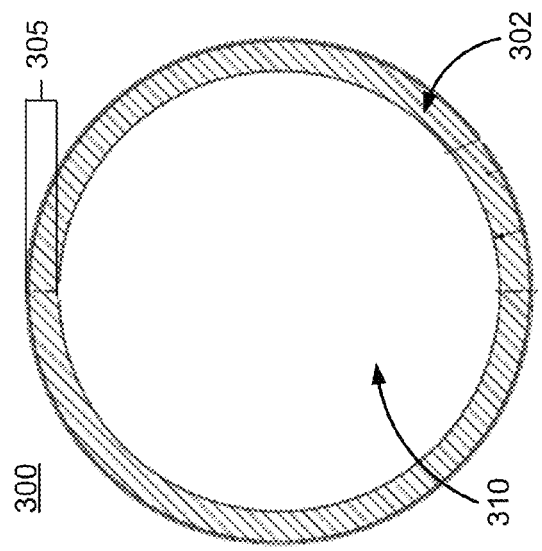
FIG. 3a (bottom view)

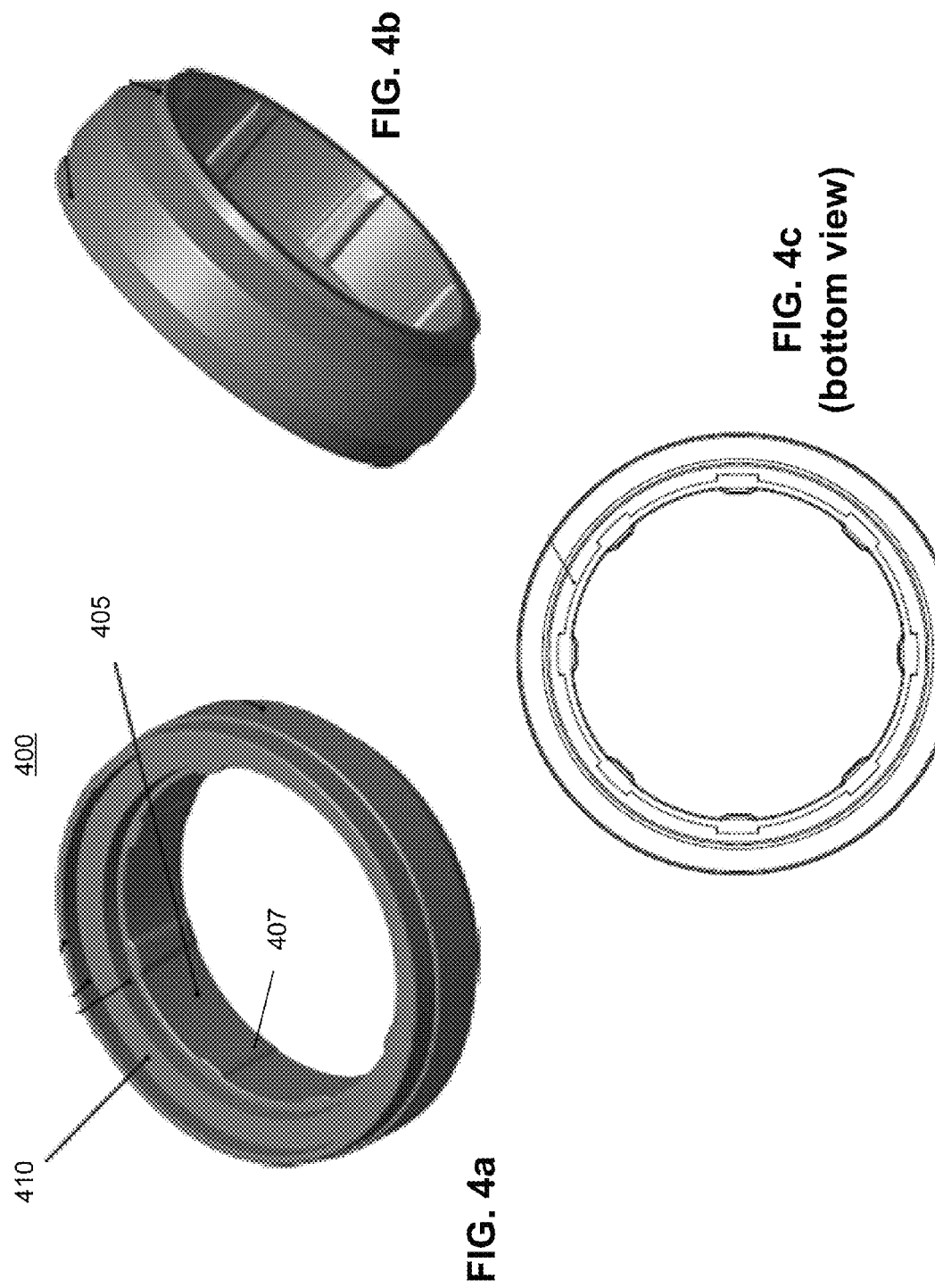

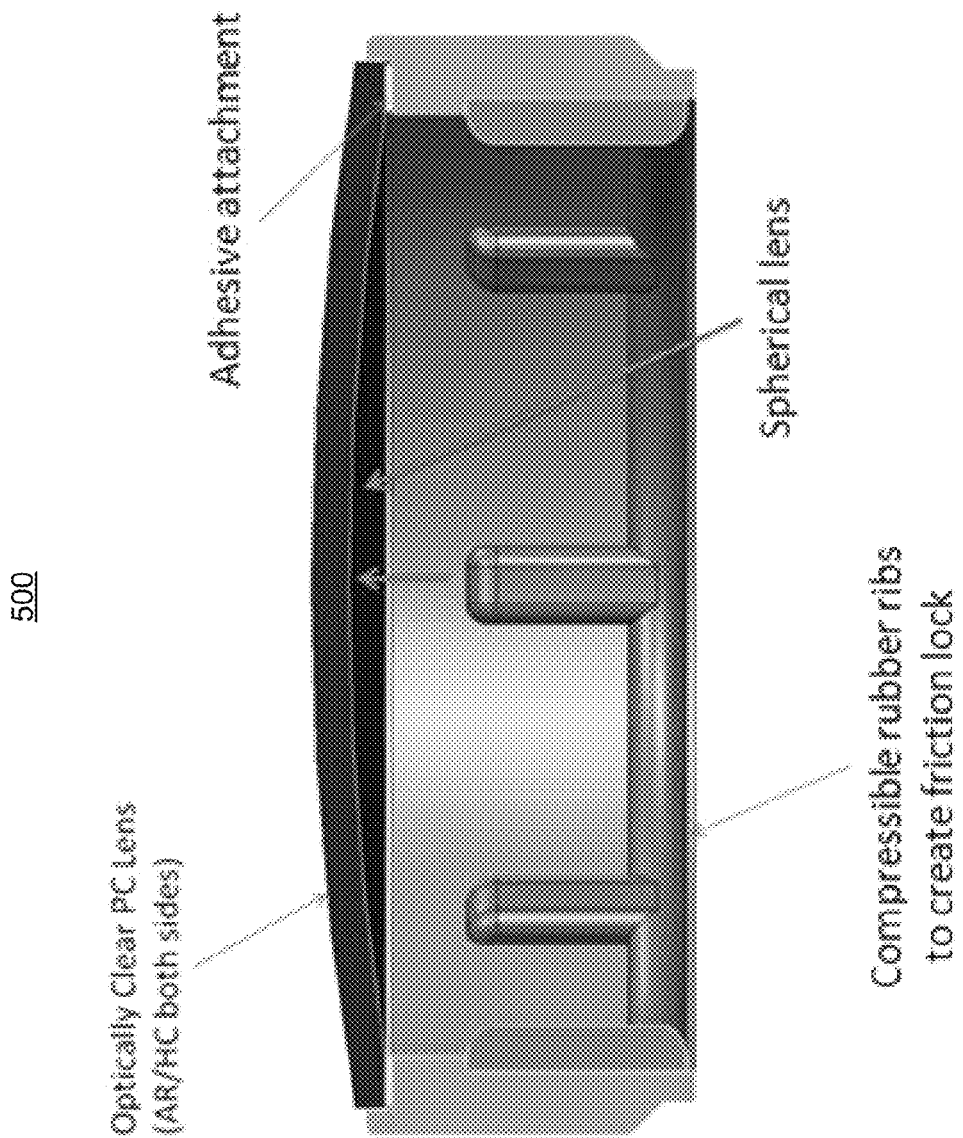

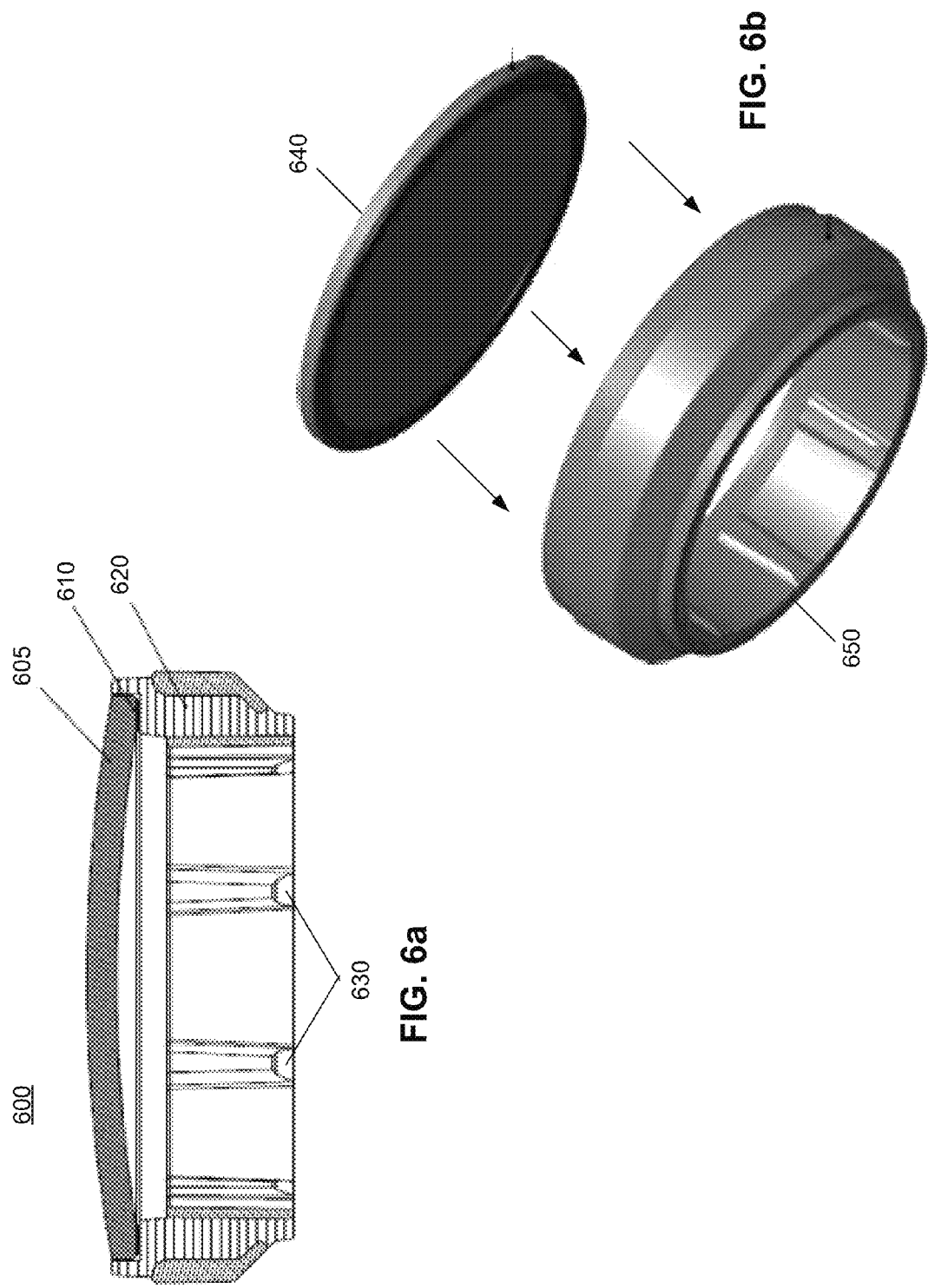

PROTECTIVE LENS ATTACHMENT

CROSS REFERENCE TO RELATED APPLICATIONS

This application claims the benefit of U.S. Provisional Application No. 61/884,891, filed Sep. 30, 2013, which is incorporated by reference in its entirety.

BACKGROUND

1. Technical Field

This disclosure relates to a camera system, and more specifically, to a removable protective lens attachment for a camera.

2. Description of the Related Art

Digital cameras are increasingly used in outdoors and sports environments. In order to allow for the safe use of cameras in such environments, the cameras need to be secured to camera mounts, which in turn can be secured to, for example, sports equipment, vehicles, or a user. One such means for securing a camera to a camera mount is a camera housing that partially encloses a camera, leaving the lens of the camera exposed to the elements, to harm from contact, and the like. The camera lens can similarly be exposed when operating the camera without a camera housing. Accordingly, allowing a user to protect a camera's lens while operating a camera without a housing that covers the lens can improve a user's experience with the camera.

BRIEF DESCRIPTIONS OF THE DRAWINGS

The disclosed embodiments have other advantages and features which will be more readily apparent from the following detailed description of the invention and the appended claims, when taken in conjunction with the accompanying drawings, in which:

FIG. 3a illustrates a bottom view of a protective lens for a protective lens attachment, according to one embodiment.

FIG. 3b illustrates a side view of a protective lens for a protective lens attachment, according to one embodiment.

FIG. 3c illustrates a top view of a protective lens for a protective lens attachment, according to one embodiment.

FIG. 4a illustrates a top perspective view of a protective lens casing for a protective lens attachment, according to one embodiment.

FIG. 4b illustrates a bottom perspective view of a protective lens casing for a protective lens attachment, according to one embodiment.

FIG. 4c illustrates a bottom view of a protective lens casing for a protective lens attachment, according to one embodiment.

FIG. 5 illustrates a cross-section view of a protective lens attachment, according to one embodiment.

FIG. 6a illustrates a cross-section view of a protective lens attachment, according to one embodiment.

FIG. 6b illustrates an exploded view of a protective lens attachment, according to one embodiment.

DETAILED DESCRIPTION

The figures and the following description relate to preferred embodiments by way of illustration only. It should be noted that from the following discussion, alternative embodiments of the structures and methods disclosed herein will be readily recognized as viable alternatives that may be employed without departing from the principles of what is claimed.

Reference will now be made in detail to several embodiments, examples of which are illustrated in the accompanying figures. It is noted that wherever practicable similar or like reference numbers may be used in the figures and may indicate similar or like functionality. The figures depict embodiments of the disclosed system (or method) for purposes of illustration only. One skilled in the art will readily recognize from the following description that alternative embodiments of the structures and methods illustrated herein may be employed without departing from the principles described herein.

Example Camera System Configuration

A camera system includes a camera and a camera housing structured to at least partially enclose the camera. The camera includes a camera body having a camera lens structured on a front surface of the camera body, various indicators on the front of the surface of the camera body (such as LEDs, displays, and the like), various input mechanisms (such as buttons, switches, and touch-screen mechanisms), and electronics (e.g., imaging electronics, power electronics, etc.) internal to the camera body for capturing images via the camera lens and/or performing other functions. The camera housing includes a lens window structured on the front surface of the camera housing and configured to substantially align with the camera lens, and one or more indicator windows structured on the front surface of the camera housing and configured to substantially align with the camera indicators.

Figure 1A:
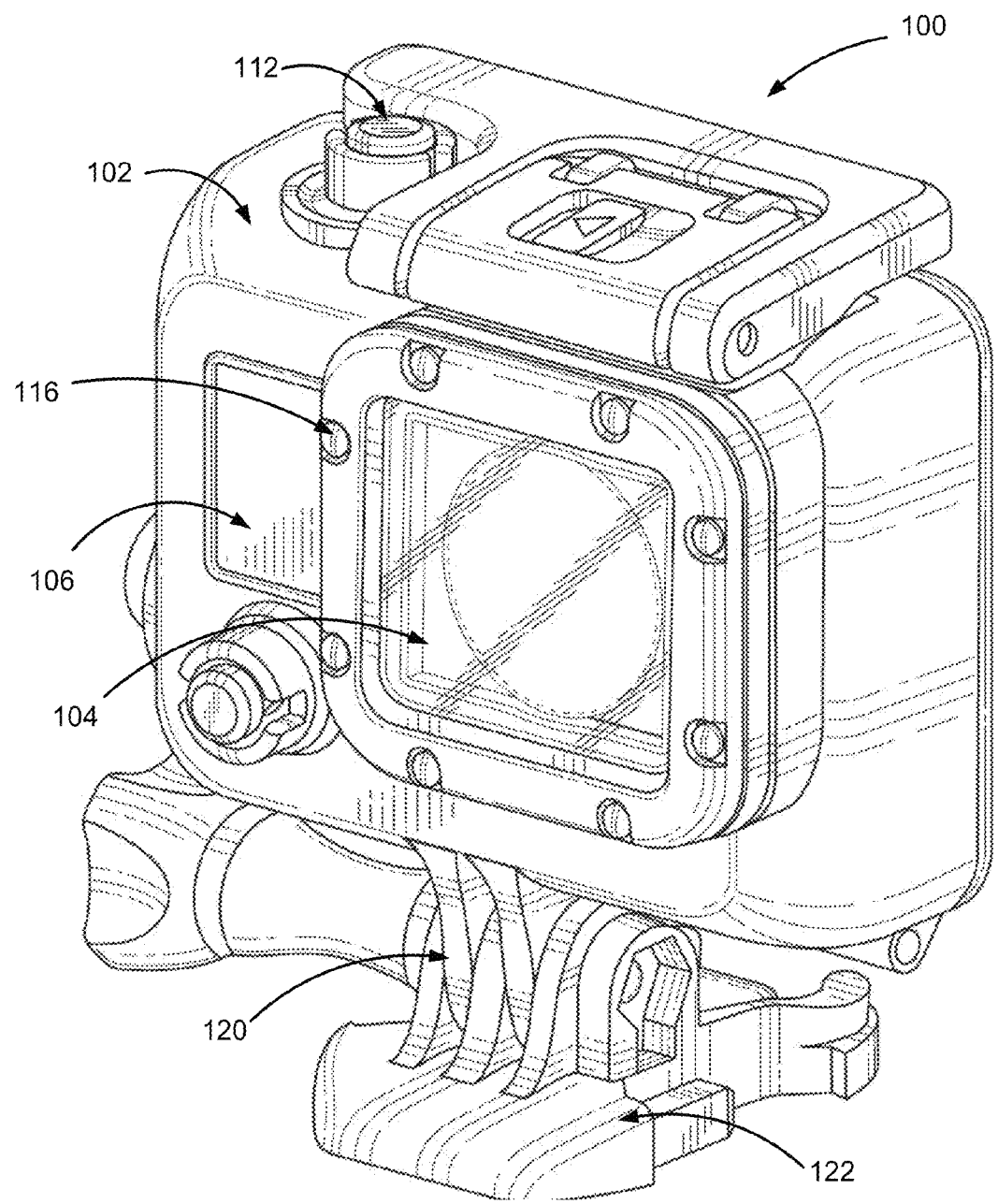
FIG. 1a illustrates a perspective view of a camera system, according to one embodiment.
Figure 1B:
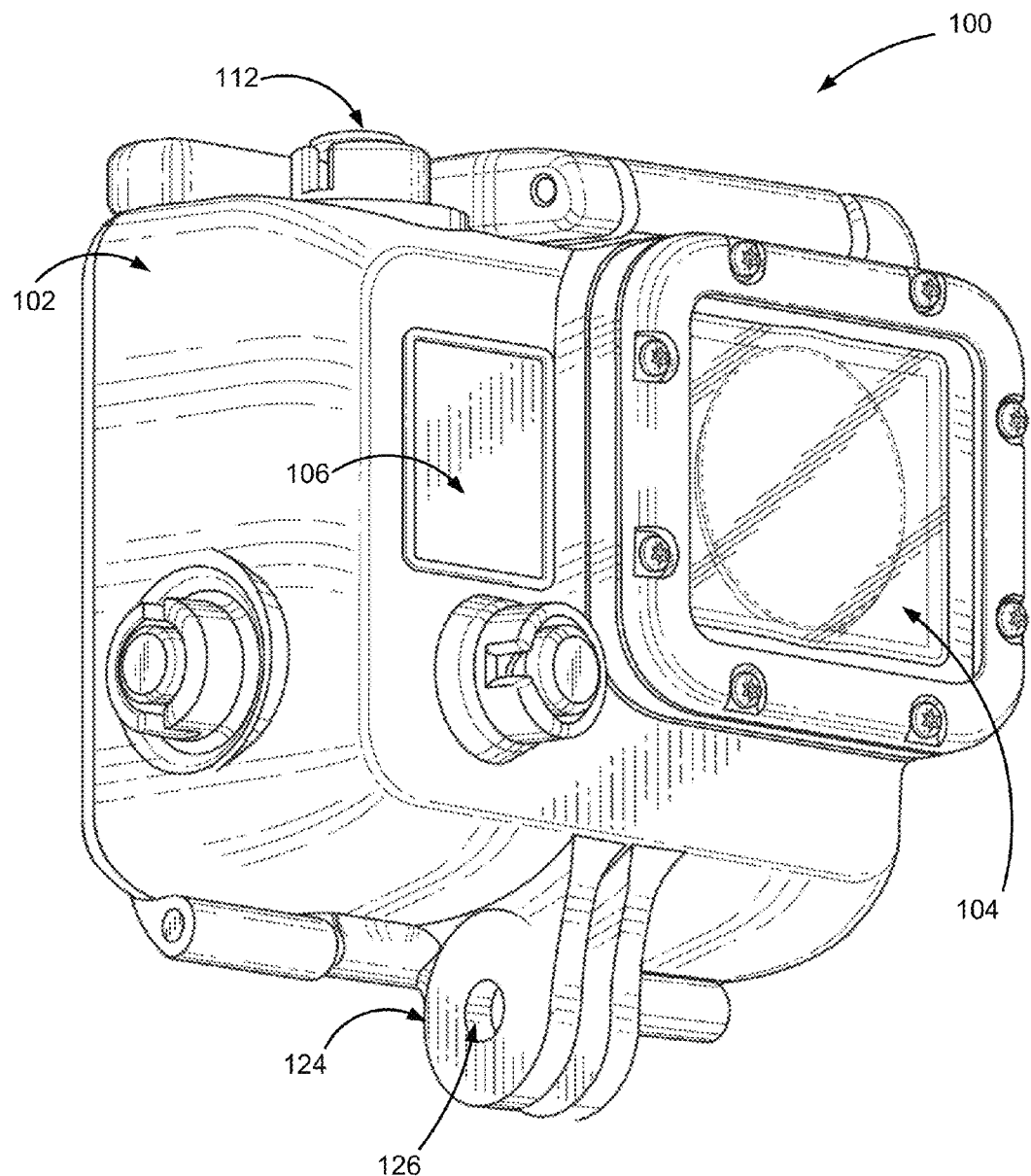
FIG. 1b illustrates another alternative perspective view of a camera system, according to one embodiment.

FIGS. 1a and 1b illustrate various views of a camera system according to one example embodiment. The camera system includes, among other components, a camera housing 100. In one embodiment, a first housing portion 102 includes a front face with four sides (i.e., a top side, bottom side, left side, and right side) structured to form a cavity that receives a camera (e.g. a still camera or video camera). In other embodiments, the camera housing 100 may not include one or more sides or faces. For instance, the camera housing 100 may not include a front or back face, allowing the front face and rear face of the camera to be exposed when partially enclosed by the top side, bottom side, left side, and right side of the camera housing 100.

In one embodiment, the camera housing 100 has a small form factor (e.g., a height of approximately 4 to 6 centimeters, a width of approximately 5 to 7 centimeters, and a depth of approximately 1 to 4 centimeters), and is lightweight (e.g., approximately 50 to 150 grams). The camera housing 100 can be rigid (or substantially rigid) (e.g., plastic, metal, fiberglass, etc.) or pliable (or substantially pliable) (e.g., leather, vinyl, neoprene, etc.). In one embodiment, the camera housing 100 may be appropriately configured for use in various elements. For example, the camera housing 100 may comprise a waterproof enclosure that protects a camera from water when used, for example, while surfing or scuba diving.

Portions of the camera housing 100 may include exposed areas to allow a user to manipulate buttons on the camera that are associated with the camera functionality. Alternatively, such areas may be covered with a pliable material to allow the user to manipulate the buttons through the camera housing 100. For example, in one embodiment the top face of the camera housing 100 includes an outer shutter button 112 structured so that a shutter button 112 of the camera is substantially aligned with the outer shutter button 112 when the camera is secured within the camera housing 100. The shutter button 112 of the camera is operationally coupled to the outer shutter button 112 so that pressing the outer shutter button 112 allows the user to operate the camera shutter button.

In one embodiment, the front face of the camera housing 100 includes a lens window 104 structured so that a lens of the camera is substantially aligned with the lens windows 104 when the camera is secured within the camera housing 100. The lens window 104 can be adapted for use with a conventional lens, a wide angle lens, a flat lens, or any other specialized camera lens. In this embodiment, the lens window 104 comprises a waterproof seal so as to maintain the waterproof aspect of the housing 100.

In one embodiment, the camera housing 100 includes one or more securing structures 120 for securing the camera housing 100 to one of a variety of mounting devices. For example, FIG. 1a illustrates the camera housing secured to a clip-style mount 122. In this example, the camera housing 100 includes a first plurality of protrusions (protrusions 124 as shown in FIG. 1b), and the mount 122 includes a second plurality of protrusions. Each protrusion includes a hole (hole 126 as shown in FIG. 1b) at a similar location within the protrusion such that the first and second pluralities of protrusions can interlock in such a way that the protrusion holes substantially align. Continuing with this example, a turnable handscrew is inserted through the aligned holes, coupling the camera housing 100 to the mount 122 such that the camera housing can pivotally rotate relative to the mount when the turnable handscrew is in a first unlocked position, and such that the camera housing is fixed in position relative to the mount when the turnable handscrew is in a second locked position. In other embodiments, the camera housing 100 can be secured to a different type of mounting structure, and can be secured to a mounting structure via a different type of coupling mechanism.

In one embodiment, the camera housing 100 includes an indicator window 106 structured so that one or more camera indicators are substantially aligned with the indicator window 106 when the camera is secured within the camera housing 100. The indicator window 106 can be any shape or size, and can be made of the same material as the remainder of the camera housing 100, or can be made of any other material, for instance a transparent or translucent material and/or a non-reflective material.

The described housing 100 may also be adapted for a wider range of devices of varying shapes, sizes and dimensions besides cameras. For example, an expansion module may be attached to housing 100 to add expanded features to electronic devices such as cell phones, music players, personal digital assistants ("PDAs"), global positioning system ("GPS") units, or other portable electronic devices.

Figure 1C:
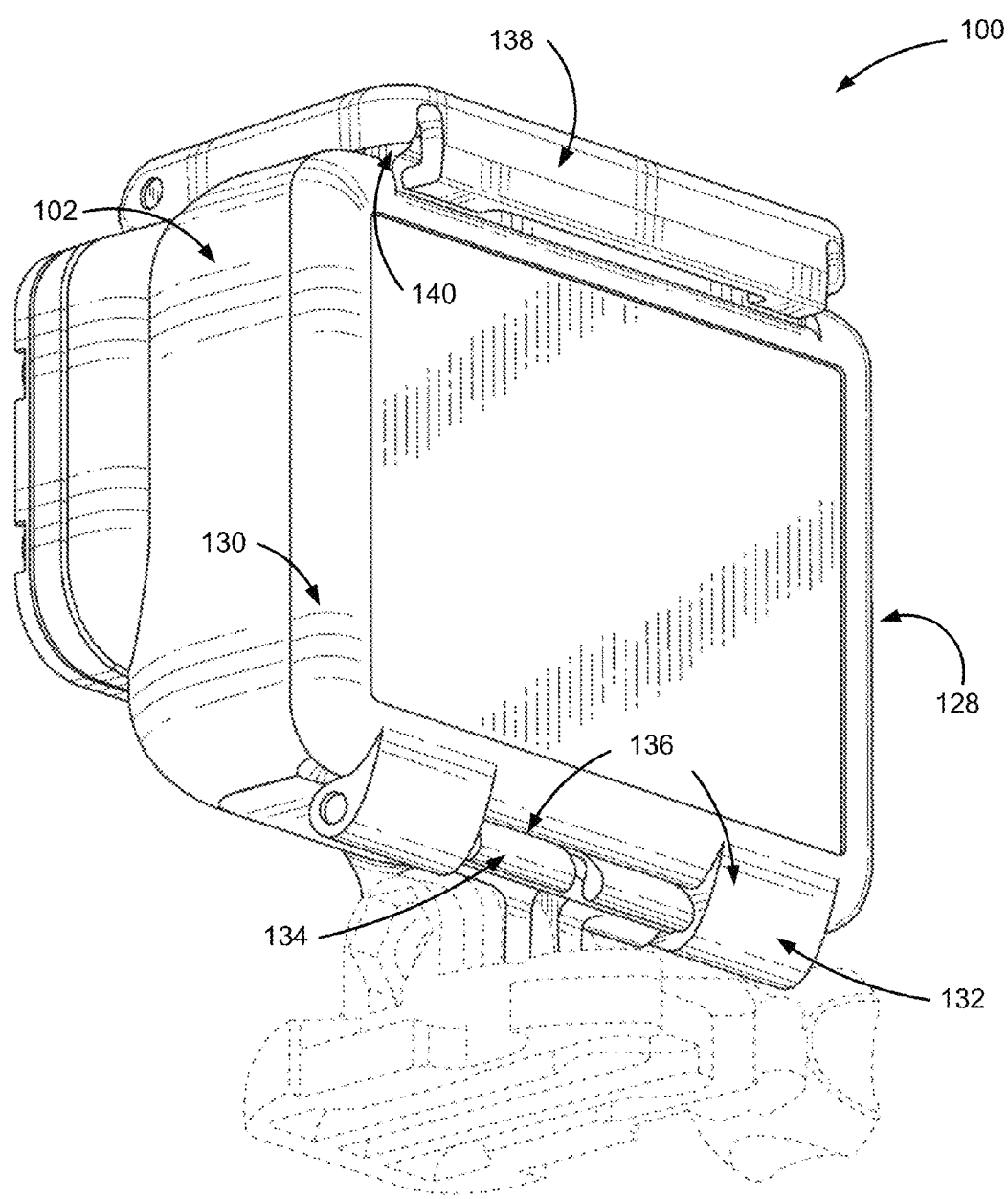
FIG. 1c illustrates a perspective view of a rear of the camera system, according to one embodiment.

FIG. 1c is a rear perspective view of camera housing 100 illustrating a second housing portion 128, according to one example embodiment. The second housing portion 128 detachably couples with the first housing portion 102 opposite the front face of the first housing portion 102. The first housing portion 102 and second housing portion 128 are collectively structured to enclose a camera within the cavity when the second housing portion 128 is secured to the first housing portion 102 in a closed position.

In one embodiment, the second housing portion 128 comprises a door 130 that allows the camera to be removed from the housing 100. The door 130 pivots around a hinge 136 that allows the door 130 to be opened or shut. In one embodiment, a first fastening structure 138 located on the top face of the camera housing 100 detachably couples to a second fastening structure 140 on the door 130. The fastening structures 138, 140 secure the door 130 to the first portion 102 of the camera housing 100 in a closed position when coupled, as illustrated in FIG. 1b. In one embodiment, the fastening structure 138 comprises a hook-shaped lateral bar and the fastening structure 140 comprises an L-shaped bar. The fastening structure 138 can pivot upwards to allow the door 130 to close and can then be pressed down around the fastening structure 140 to hold the door 130 in the closed position. In different embodiments, fastening structures for securing the door 130 can include, for example, a button assembly, a buckle assembly, a clip assembly, a hook and loop assembly, a magnet assembly, a ball and catch assembly, and an adhesive assembly, or any other type of securing mechanism.

In one alternative embodiment, the hinge 136 is instead located on the top face of the housing 100 and the fastening structures 138, 140 are instead located on the bottom face of the housing 100. Alternatively, the hinge 136 and fastening structures 138, 140 may be located on opposite side faces of the camera housing 100.

In one embodiment, the housing 100 includes a watertight seal so that the housing 100 is waterproof when the door 130 is shut. For example, in one embodiment, the door 130 includes a sealing structure positioned on interior edges of the door 130. The sealing structure provides a watertight seal between the first portion of the camera housing 102 and the door 130 when the first securing structure 138 on the top face of the camera housing 100 is coupled to the second securing structure 140 on the top edge of the door 130.

In one embodiment, an outer hinge structure 132 on the bottom edge of the second housing portion 128 detachably couples to an inner hinge structure 134 on the bottom edge of the first housing portion 102 to form the hinge 136. For example, in one embodiment, the outer hinge structure 132 comprises one or more hook-shaped protrusions structured to securely fasten to a rod-shaped member of the inner hinge structure 134. Other mechanisms for coupling the second housing portion 128 to the housing 100 may also be used in various alternative embodiments. In other embodiments, the second housing portion 128 may be permanently attached to the first housing portion 102.

Figure 2A:
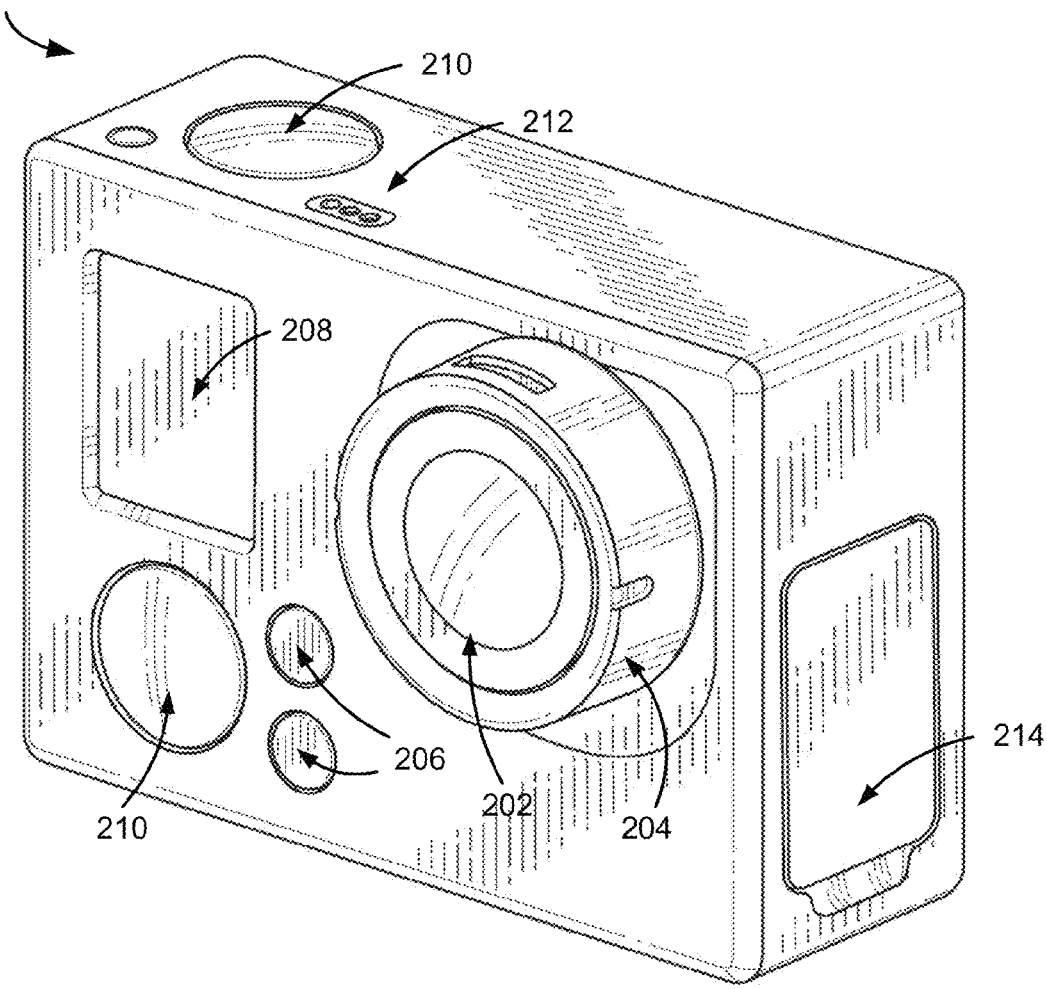
FIG. 2a illustrates a perspective view of a camera for use with the camera system, according to one embodiment.

FIG. 2a illustrates a camera 200 for use with the camera systems described herein, according to one example embodiment. The camera 200 is configured to capture images and video, and to store captured images and video for subsequent display or playback. The camera 200 is adapted to fit within a camera housing, such as the housing 100 discussed above or any other housing described herein. As illustrated, the camera 200 includes a lens 202 configured to receive light incident upon the lens and to direct received light onto an image sensor internal to the lens. The lens 202 is enclosed by a lens ring 204. The lens ring can be made of any material, for instance hard plastic or rubber, and can be configured to be gripped by a protective lens attachment.

The camera 200 can include various indicators, including the LED lights 206 and the LED display 208 shown in FIG. 2a. When the camera 200 is enclosed within the housing 100, the LED display 208 is configured to substantially align with the indicator window 106, and the LED lights 206 are configured to be visible through the housing 100. The camera 200 can also include buttons 210 configured to allow a user of the camera to interact with the camera, to turn the camera on, and to otherwise configure the operating mode of the camera. The camera 200 can also include a microphone 212 configured to receive and record audio signals in conjunction with recording video. The side of the camera 200 includes an I/O interface 214. Though the embodiment of FIG. 2a illustrates the I/O interface 214 enclosed by a protective door, the I/O interface can include any type or number of I/O ports or mechanisms, such as USC ports, HDMI ports, memory card slots, and the like.

Figure 2B:
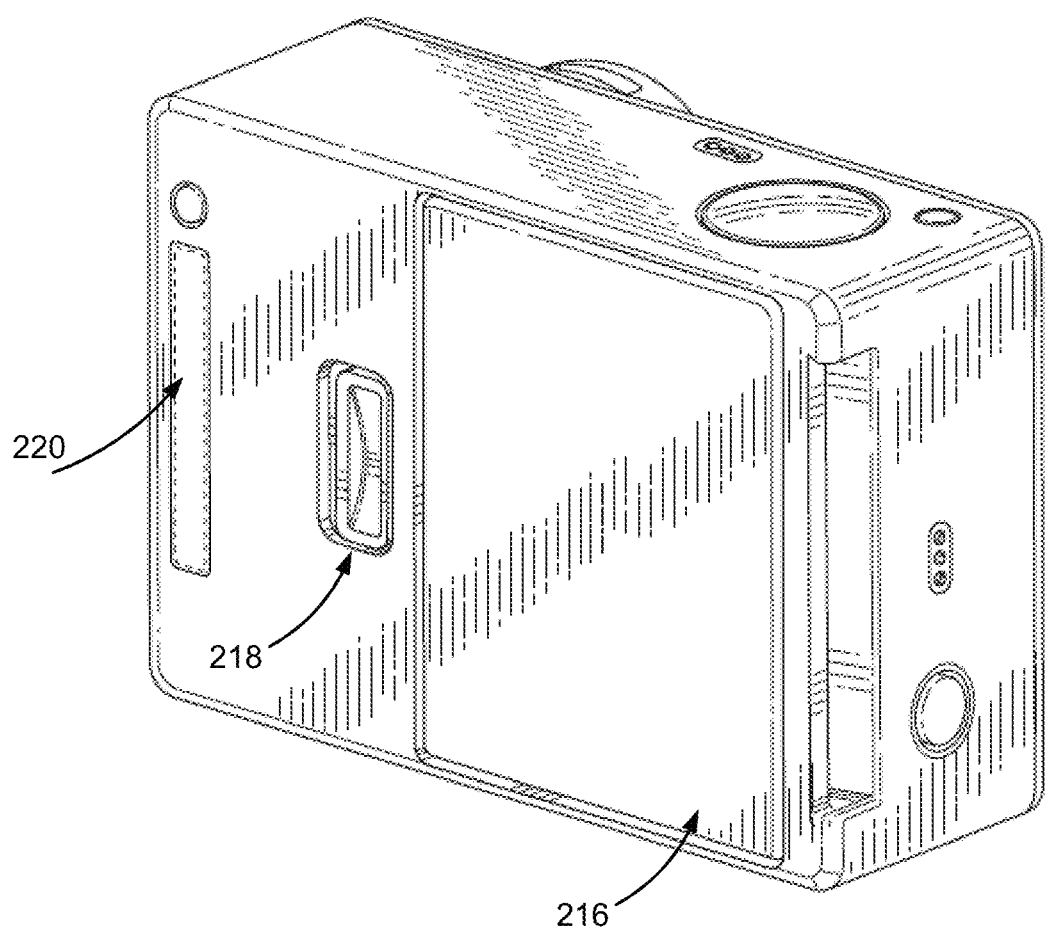
FIG. 2b illustrates a perspective view of a rear of a camera for use with the camera system, according to one embodiment.

FIG. 2b illustrates a perspective view of a rear of a camera 200 for use with the camera system, according to one embodiment. The camera 200 includes a door 216 that covers a removable battery and battery interface. The door 216 can be removed via the door release mechanism 218. The camera also includes an expansion pack interface 220 configured to receive a removable expansion pack, such as a display module, an extra battery module, a wireless module, and the like. Removable expansion packs, when coupled to the camera 200, provide additional functionality to the camera via the expansion pack interface 220.

Protective Lens Attachment

A protective lens attachment can be coupled to a camera lens to protect the camera lens during operation without a protective housing. The protective lens attachment can include a protective lens casing and a protective lens. The protective lens can be configured to simultaneously protect the camera lens from flying debris (for instance, up to 45 mph or more) while providing excellent image quality and reducing audio artifacts from wind turbulence caused by the protective lens attachment. In addition, the protective lens attachment can be mechanically robust to endure harsh vibration and shock environments.

FIG. 3a illustrates a bottom view of a protective lens for a protective lens attachment, according to one embodiment. FIG. 3b illustrates a side view of a protective lens for a protective lens attachment, according to one embodiment. FIG. 3c illustrates a top view of a protective lens for a protective lens attachment, according to one embodiment. It should be noted that in other embodiments, a protective lens can have dimensions, shapes, and sizes other than those described herein.

The protective lens 300 includes a planar ring 302 around the bottom of the protective lens. The planar ring 302 is substantially flat, and the width 305 of the planar ring can vary. In some embodiments, the width 305 is substantially equivalent to the width of a reciprocal surface of a protective lens casing. The protective lens includes a bottom surface 310 that is concave from the perspective of FIG. 3a, curving inward and away from the plane defined by the planar ring 302.

The diameter 320 of the bottom concave surface 310 of the protective lens is less than the diameter 315 defined by the top surface 320 of the protective lens. The top surface 320 is convex from the perspective of FIG. 3c, curing outward and away from the plane defined by the planar ring 302.

The shape and dimensions of the protective lens 300 can be selected to minimize vignetting effects within images representing light captured through the protective lens. The shape and dimensions of the protective lens can also be selected to minimize noise from wind turbulence caused by the protective lens during operation when the protective lens attachment is coupled to a moving camera. The protective lens thickness can be selected based on a determined desired resistance to impact, for instance from projectiles or other contact. The protective lens can be made of glass, crystal, plastic, or any other material suitable for use in capturing images while minimizing optical artifacts as a result of the protective lens. In some embodiments, the protective lens can be coated with a protective coating configured to further protect the camera lens, to reduce optical artifacts as a result of the protective lens, and the like. For example, the protective lens can be coated with a broadband anti-reflective ("BBAR") coating and/or a hydrophilic coating on the top side or the bottom side of the lens.

FIG. 4a illustrates a top perspective view of a protective lens casing for a protective lens attachment, according to one embodiment. The protective lens casing 400 in the embodiment of FIG. 4a is a substantially circular ring configured to couple to a camera lens ring, such as the lens ring 204 of FIG. 2a. The protective lens casing 400 includes a compressible material 405 on the inside of the casing ring. The compressible material 405 can be any material that is configured to compress inward and away from the center of the casing ring when the protective lens casing is fit over and coupled to a camera lens ring. For instance, the compressible material 405 can be rubber, foam, plastic, thermoplastic polyurethane elastomer, or any other suitable material.

The diameter of the casing ring of the protective lens casing can be selected based on the diameter of a camera lens ring, for instance so that the protective lens casing fits securely over a camera lens ring such that the camera lens ring compresses the compressible material. When the protective lens casing is securely fit onto a camera lens ring, the camera lens ring exerts a force outward, causing the compressible material 405 to compress into the protecting lens casing. In response, the compressible material 405 exerts a reciprocal outward (towards the center of the casing ring) force, creating friction between the compressible material and the camera lens ring, securing the protective lens casing to the camera lens ring. In addition to securing the protective lens casing to the camera lens ring, the friction force can beneficially prevent the protecting lens attachment from rattling or vibrating during camera operation.

The compressible material 405 in the embodiment of FIG. 4a includes ridges, such as ridge 407. The force exerted by the camera lens ring on the ridges (such as ridge 407) is greater than the force exerted by the camera lens ring on the remainder of the compressible material 405. As a result, the ridges exert a greater reciprocal force onto the camera lens ring, further securing the protective lens casing to the camera lens ring by providing additional friction between the compressible material 405 and the camera lens ring.

The protective lens casing of FIG. 4a includes a flat ring surface 410 configured to receive, for example, the protective lens 300 of FIGS. 3a-3c. In some embodiments, the width of the flat ring surface 410 is selected to be equivalent to the width of the planar ring 302. In operation, the protective lens 300 is secured to the protective lens casing such that the planar ring 302 of the protective lens is substantially flush with the flat ring surface 410 of the protective lens casing 400. The lens 300 can be secured to the protective lens casing 400 by any suitable means, for instance by adhesive (such as glue, adhesive tape, and the like), or mechanically (using, for example, a securing latch or other mechanism not illustrated in FIG. 4a). FIG. 4b illustrates a bottom perspective view of a protective lens casing for a protective lens attachment, according to one embodiment. FIG. 4c illustrates a bottom view of a protective lens casing for a protective lens attachment, according to one embodiment.

FIG. 5 illustrates a cross-section view of a protective lens attachment, according to one embodiment. In the embodiment of FIG. 5, a semi-spherical protective lens is securely coupled to a protective lens casing via an adhesive attachment, forming the protective lens attachment 500. As illustrated in FIG. 5, the lens is optically clear, and includes an AR/HC coating on both sides. The protective lens attachment also includes compressible rubber ribs coupled to the inside surface of the protective lens attachment.

As noted above, the protective lens attachment is configured to securely couple to a camera lens ring. When coupled, the camera lens ring exerts an outward force on the compressible rubber ribs of the protective lens attachment. In response, the compressible rubber ribs exert a reciprocal force on the camera lens ring, creating a friction between the compressible rubber ribs and the camera lens ring. The friction creates a friction lock, coupling the protective lens attachment to the camera lens ring, allowing a user to operate the camera with the protective lens attachment such that the camera lens is protected from contact. Beneficially, by using a friction lock instead of a mechanical lock, a user can remove the protective lens attachment from the camera by simply applying an amount of outward force (away from the camera) to the protective lens attachment that overcomes the friction force applied by the compressible rubber ribs on the camera lens ring.

FIG. 6a illustrates a cross-section view of a protective lens attachment, according to one embodiment. The protective lens attachment 600 of FIG. 6a includes a protective lens 605, an adhesive coupler 610 coupling the lens to the protecting lens casing 620. The protective lens casing 620 includes an inner cavity or casing ring, and includes a number of compressible ridges 630 configured to secure the protective lens attachment 600 to a camera lens ring as described herein. FIG. 6b illustrates an exploded view of a protective lens attachment, according to one embodiment. The lens 640 is secured onto the protective lens casing 650, for instance using an adhesive or other securing mechanism.

Additional Configuration Considerations

Throughout this specification, some embodiments have used the expression "coupled" along with its derivatives. The term "coupled" as used herein is not necessarily limited to two or more elements being in direct physical or electrical contact. Rather, the term "coupled" may also encompass two or more elements are not in direct contact with each other, but yet still co-operate or interact with each other, or are structured to provide a thermal conduction path between the elements.

Likewise, as used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus.

In addition, use of the "a" or "an" are employed to describe elements and components of the embodiments herein. This is done merely for convenience and to give a general sense of the invention. This description should be read to include one or at least one and the singular also includes the plural unless it is obvious that it is meant otherwise.

Finally, as used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

Upon reading this disclosure, those of skill in the art will appreciate still additional alternative structural and functional designs for a camera expansion module as disclosed from the principles herein. Thus, while particular embodiments and applications have been illustrated and described, it is to be understood that the disclosed embodiments are not limited to the precise construction and components disclosed herein. Various modifications, changes and variations, which will be apparent to those skilled in the art, may be made in the arrangement, operation and details of the method and apparatus disclosed herein without departing from the spirit and scope defined in the appended claims.

The invention claimed is:

1. A camera system including:
a camera comprising a lens and lens housing, the lens housing protruding outward from a front surface of the camera and securely enclosing the lens, the lens housing comprising an outer lens housing surface; and
a protective lens attachment comprising a protective lens and a protective lens casing, the protective lens casing comprising an open side and a lens side, the protective lens casing securely enclosing the protective lens at the lens side and comprising an opening into the protective lens casing at the open side, the protective lens casing further comprising an interior surface, a compressible ring located around an inside perimeter of the interior surface such that no gap exists between the compressible ring and an edge at the open side, and a plurality of compressible ribs perpendicular to the compressible ring, protruding from the interior surface, and running from the compressible ring towards and perpendicular to the protective lens such that a gap exists between each compressible rib and the lens and such that no gap exists between each compressible rib and the compressible ring, the protective lens attachment configured to securely couple over the lens housing such that the outer lens housing surface exerts a compressive force outward against the compressible ribs and the compressible ring and the compressible ribs and compressible ring exert a reciprocal force onto the outer lens housing surface, wherein the lens of the camera and the protective lens of the protective lens attachment are aligned when the protective lens attachment is securely coupled over the lens housing.

2. The camera system of claim 1, wherein the protective lens comprises a flat planar ring along a perimeter of a bottom surface of the protective lens.

3. The camera system of claim 2, wherein the protective lens casing comprises a reciprocal flat planar ring surface, the flat planar ring of the protective lens configured to make flush contact with the reciprocal flat planar ring surface of the protective lens casing when the protective lens is coupled to the protective lens casing.

4. The camera system of claim 3, wherein the flat planar ring of the protective lens is adhesively coupled to the reciprocal flat planar ring surface of the protective lens casing.

5. The camera system of claim 2, wherein the flat planar ring of the protective lens surrounds a concave portion of the bottom surface of the protective lens.

6. The camera system of claim 1, wherein the protective lens mechanically couples to the protective lens casing.

7. The camera system of claim 1, wherein the protective lens is selected to minimize vignetting effects within images captured using the protective lens attachment.

8. A protective lens attachment including:
   a protective lens; and
   a protective lens casing comprising an open side and a lens side and configured to couple to the protective lens at the lens side, the protective lens casing comprising an opening into the protective lens casing at the open side, the protective lens casing including a hollow interior, an interior surface, a compressible ring located around an inside perimeter of the interior surface such that no gap exists between the compressible ring and an edge at the open side, and a plurality of compressible ribs perpendicular to the compressible ring, protruding from the interior surface, and running from the compressible ring towards and perpendicular to the protective lens such that a gap exists between each compressible rib and the lens side and such that no gap exists between each compressible rib and the compressible ring, the compressible ribs configured to be compressed by a camera lens ring when the camera lens ring is inserted into the protective lens casing interior, the compressible ribs configured to exert a reciprocal force onto the camera lens ring, securely coupling the protective lens casing onto the camera lens ring.

9. The protective lens attachment of claim 8, wherein the protective lens comprises a flat planar ring along a perimeter of a bottom surface of the protective lens.

10. The protective lens attachment of claim 9, wherein the protective lens casing comprises a reciprocal flat planar ring surface, the flat planar ring of the protective lens configured to make flush contact with the reciprocal flat planar ring surface of the protective lens casing when the protective lens is coupled to the protective lens casing.

11. The protective lens attachment of claim 10, wherein the flat planar ring of the protective lens is adhesively coupled to the reciprocal flat planar ring surface of the protective lens casing.

12. The protective lens attachment of claim 9, wherein the flat planar ring of the protective lens surrounds a concave portion of the bottom surface of the protective lens.

13. The protective lens attachment of claim 8, wherein the protective lens mechanically couples to the protective lens casing.

14. The protective lens attachment of claim 8, wherein the protective lens is selected to minimize vignetting effects within images captured using the protective lens attachment.

\* \* \* \* \*